United States Patent
Tison et al.

(10) Patent No.: US 6,892,604 B2
(45) Date of Patent: May 17, 2005

(54) HEADSET SPACER UNIT AND STEERING ASSEMBLY EQUIPPED THEREWITH

(75) Inventors: Robert Wayne Tison, Fletcher, NC (US); Thomas W. Reeder, Fletcher, NC (US)

(73) Assignee: Cane Creek Cycling Components, Inc., Fletcher, NC (US)

( * ) Notice: Subject to any disclaimer, the term of this patent is extended or adjusted under 35 U.S.C. 154(b) by 0 days.

(21) Appl. No.: 10/013,537

(22) Filed: Dec. 13, 2001

(65) Prior Publication Data

US 2003/0110880 A1 Jun. 19, 2003

(51) Int. Cl.[7] .............................................. B62K 21/12
(52) U.S. Cl. ....................... 74/551.1; 411/546; 280/279
(58) Field of Search ............................. 74/551.1–551.8; 411/546; 280/279

(56) References Cited

U.S. PATENT DOCUMENTS

| | | | | |
|---|---|---|---|---|
| 3,833,242 A | * | 9/1974 | Thompson, Jr. | 280/281.1 |
| 4,593,924 A | * | 6/1986 | Cabeza | 280/279 |
| 5,095,770 A | | 3/1992 | Rader, III | |
| 5,331,864 A | * | 7/1994 | Chi | 74/551.1 |
| 5,385,360 A | * | 1/1995 | Shook | 280/279 |
| 5,405,202 A | * | 4/1995 | Chi | 384/545 |
| 5,540,457 A | | 7/1996 | Johnson | |
| 5,615,585 A | * | 4/1997 | Chi | 74/551.1 |
| 5,775,709 A | * | 7/1998 | Chen | 280/279 |
| 5,918,895 A | * | 7/1999 | Chi | 280/279 |
| 5,964,474 A | * | 10/1999 | Chen | 280/279 |
| 6,019,017 A | * | 2/2000 | Lin | 74/551.1 |
| 6,167,780 B1 | | 1/2001 | Chen | |

FOREIGN PATENT DOCUMENTS

| DE | 19940969 A1 | * | 11/2000 | 74/551.1 |
|---|---|---|---|---|
| GB | 2345676 A | * | 7/2000 | 74/551.1 |

OTHER PUBLICATIONS

Halliday & Resnick, Physics Parts I & II, John Wiley & Sons, Inc. Publisher, 1967, pp. 109–106.*

* cited by examiner

Primary Examiner—Vinh T. Luong
(74) Attorney, Agent, or Firm—Nixon Peabody LLP; David S. Safran

(57) ABSTRACT

A headset spacer unit and a steering assembly equipped therewith in which the headset spacer unit is formed of a plurality of annular spacers, each of which has a configuration at top and bottom sides thereof which is shaped to enable a bottom side of each of the plurality of spacer to make an interlocking engagement with a top side of another of said plurality of annular spacers in a manner preventing relative radial movement between the spacers. In the steering assembly, advantageously, a highest component of the headset and a bottom surface of the handle bar stem have a complementary configuration for engaging with the configuration of a respective side of the spacer unit.

4 Claims, 7 Drawing Sheets

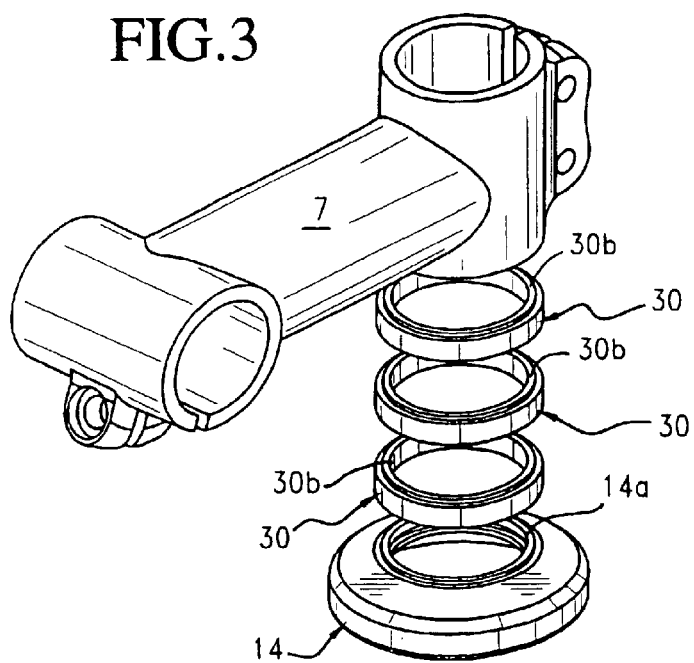
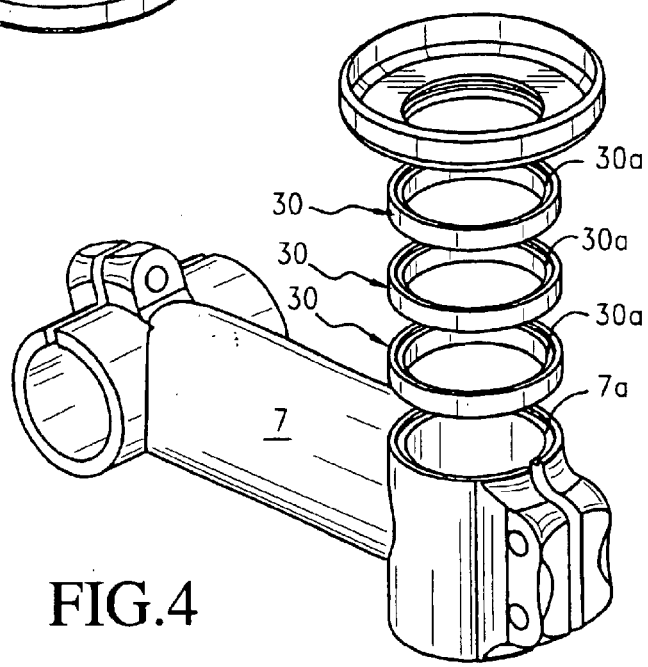

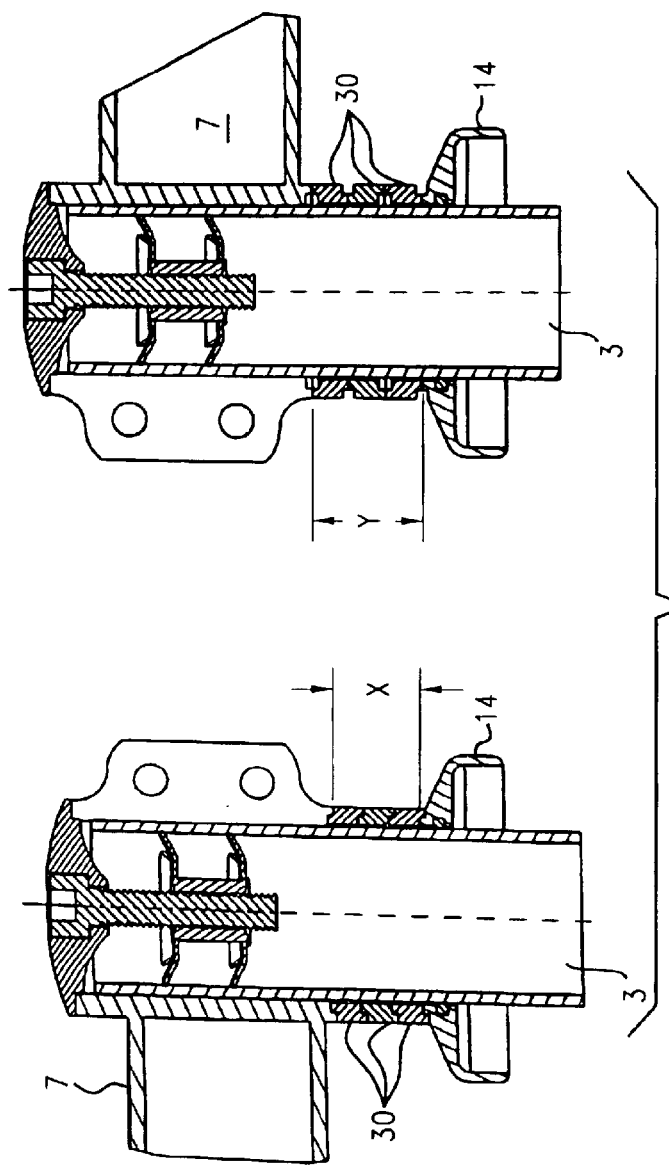
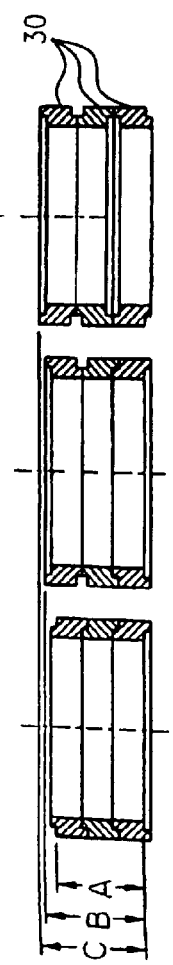
FIG.5
FIG.6

HEADSET SPACER UNIT AND STEERING ASSEMBLY EQUIPPED THEREWITH

BACKGROUND OF THE INVENTION

1. Field of the Invention

The present invention relates to a steering assemblies for bicycles and similar vehicles of the type having a threadless steerer tube and a threadless headset for connecting the steerer tube to the bicycle frame head tube.

2. Description of Related Art

Historically, the stem connecting the handlebars to the steerer tube of a bicycle was of a general "L" shape with one portion extending into the top of the steerer. This portion could be inserted to a varying extent to adjust the height of the handlebars. This historical "L" type stem is used exclusively with steerers having threaded outer diameters. The system allowed for continuous variable adjustment of the handlebar height, but the had many limitations and problems.

With the invention of a headset assembly for bicycles as discussed in U.S. Pat. No. 5,095,770, which allowed the use of a threadless steerer and a simplified stem design, the most commonly used stems offer no height adjustment. To compensate for the lack of adjustability within the stem itself, simple hollow and generally cylindrical spacers have been used above the headset assembly and below the handlebar stems, while the steerers are cut to length once the appropriate height has been determined. These simple hollow cylindrical spacers are used in varying quantities and with varying heights, though typically multiple spacers are used in a stacked arrangement. In some cases, spacers are also placed above the handlebar stem so as to eliminate the need to cut the steerer, thereby enabling the handlebar stem to be raised at a later time.

The currently used simple hollow cylindrical headset spacers have limitations. They must have an inner diameter sufficiently large to enable easy assembly over steerers. Since steerers vary slightly in outer diameter between manufacturers and as a result of normal manufacturing variation of steerers and spacers, there usually exists an undesirable radial clearance between the outer diameter of the steerer and the inner diameter of the spacers.

As a result of radial loads acting on the steerer and emanating from the handlebars, this radial clearance can promote intermittent bending flexure of the steerer between the handlebar stem and the headset assembly and radial movement of headset spacers. These, in turn, cause eccentric loading of the headset bearings, axial movement of the handlebar stem along the steerer, loosening of the headset assembly preload, and noise due to the relative motion between these parts.

Certain newer bicycle forks with steerers made of lightweight composite materials are even more susceptible to these problems. This is likely due to reduced bending stiffness and a lower coefficient of friction between the handlebar stem and steerer. Certain manufacturers even recommend the use of minimal headset spacers to minimize the problems with these forks.

Another limitation of current headset spacers is that there is no provision for preventing rotational motion of headset spacers relative to each other and/or the bottom of the handlebar stem and the top of the headset assembly. Rotational freedom can potentially promote relaxation of the headset preload as well.

Separate and apart from the above-described spacers, are constructions designed to enable the pre-load on the headset bearing assembly to be adjusted after setup of the steerer assembly. One such arrangement is described in U.S. Pat. No. 5,540,457. In this arrangement, the handlebar stem has a tube which fits over the steerer tube and is threaded at its lower end to receive a threaded locking collar. The pre-load on the bearings can be adjusted by turning the locking collar. However, such a pre-load adjustment arrangement is not a substitute for the height adjustment provided by above-described spacers.

SUMMARY OF THE INVENTION

In view of the foregoing, it is an object of the present invention to provide a spacer unit which avoids the shortcomings of current headset spacers.

It is a further object of the invention to provide a spacer unit which enables a single combination of spacers to provide a number of different stack heights to be achieved by simply changing the relative position and/or orientation of one or more spacers relative to each other.

Yet another object of the invention is provide a spacer unit in which the spacers are not only interlockable so as to prevent relative displacement between the spacers in a radial direction, but also in a circumferential direction.

Still another object of the invention is the present invention is provide a spacer unit which not only enables a height adjustment to be achieved therewith, but also can serve to adjust the pre-loading of the steering assembly headset bearings.

It is also an object of the present invention to provide steering assembly in which a spacer unit in accordance with the present invention is able to interlock with handlebar stem and/or the top cover or upper bearing race of headset.

The above indicated objects and others are achieved in accordance with the present invention by the headset spacer unit being comprised of a plurality of annular spacers, each of which has a configuration at top and bottom sides thereof which is shaped to enable a bottom side of each of the plurality of spacer to make an interlocking engagement with a top side of another of said plurality of annular spacers in a manner preventing relative radial movement therebetween. Such is achievable in accordance with the invention through the use of a radially stepped configuration.

Furthermore, the configuration at the top side of each spacer differs from the configuration at the bottom side of each spacer such that interlocking engagement is prevented when spacers are stacked with bottom sides and/or top sides facing each other. When one or more spacers are so arranged, a stack height of the stacked spacers is produced which is different from the stack height of spacers which results when the spacers are in interlocking engagement, thereby enabling multiple discrete stack heights to be produced with a single set of spacers, not only by varying the number of spacers used, but also by changing their orientation relative to each other.

In accordance with other embodiments, varying stack heights can be produced by changing the relative rotational position of adjacent spacers through the use of a spacer design having a "staircase" configuration of steps that increase in height in a circumferential direction.

In a simpler form, a step and notch configuration can be used to prevent relative rotation between adjoining spacers.

In the steering assembly of the invention, the lower face of the handlebar stem and/or upper face of the top cover, upper bearing race, compression member or other topmost component of the headset is provided with a matching configuration to that of the spacers so as to enable the same interactions to be achieved between the spacers and the lower face of the handlebar stem and/or upper face of the top cover or upper bearing race of headset as are obtainable between spacers.

These and other objects, features and advantages of the present invention will become apparent from the following detailed description of preferred embodiments of the invention when considered in conjunction with the accompanying drawings

BRIEF DESCRIPTION OF THE DRAWINGS

FIGS. 3 & 4 are, respectively, top and bottom exploded perspective views of the handlebar stem, spacer unit and headset top cover of the bicycle steering assembly of FIG. 1;

FIG. 5 contains a comparison of the stack height of handlebar stem, spacer unit and headset top cover of the bicycle steering assembly of FIG. 1 with all spacers interlocked and with top and bottom spacers of the spacer unit inverted;

FIG. 6 illustrates how three different spacer stack heights are obtainable with the same three spacers of the spacer unit of the present invention.

DETAILED DESCRIPTION OF THE INVENTION

Figure 1:
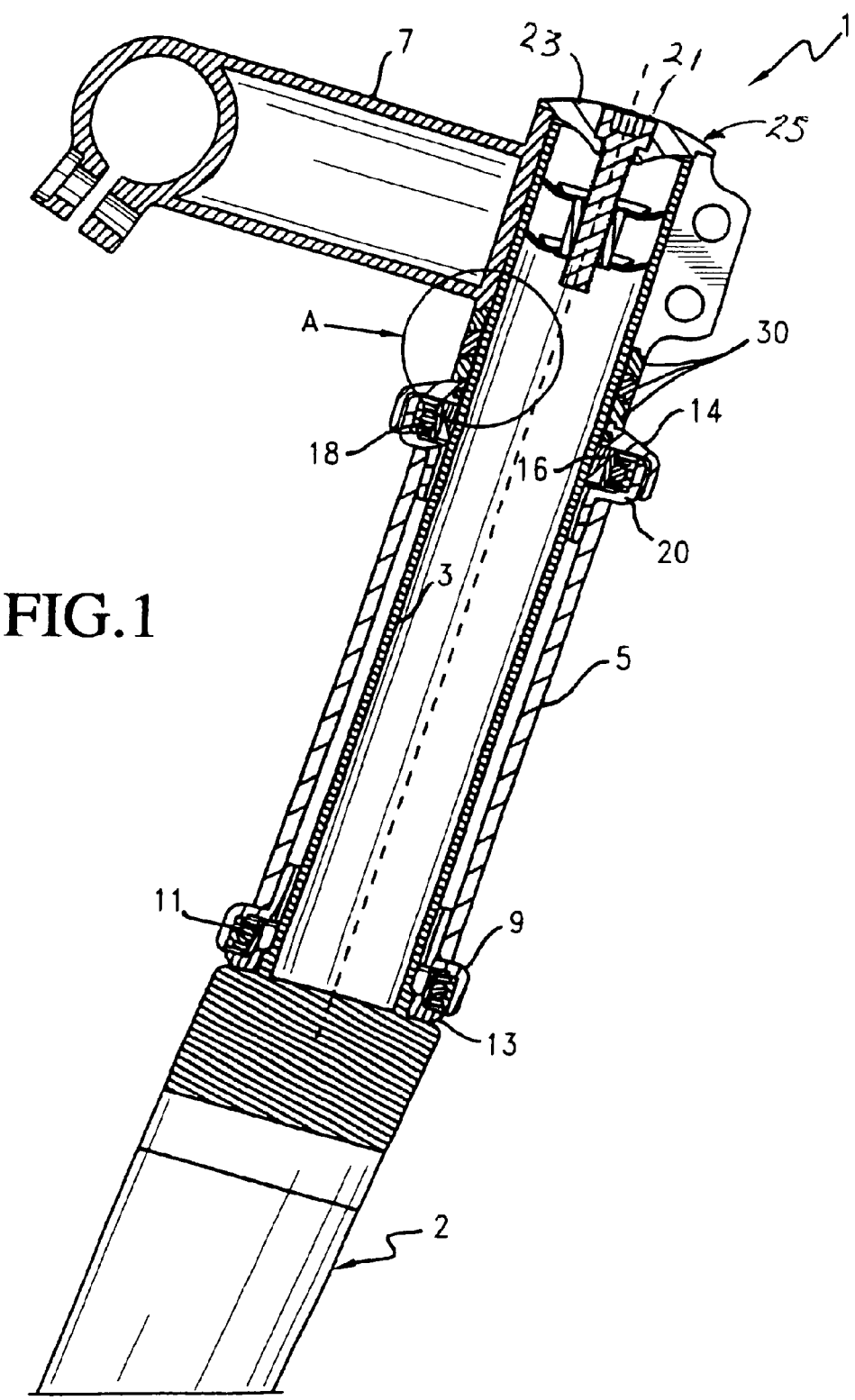
FIG. 1 is a cross sectional view of a bicycle steering assembly in accordance with an embodiment of the present invention.

With reference to FIG. 1, it can be seen that the steering assembly 1 comprises a bicycle front fork 2 which has a steerer tube 3 that is passed through the head tube 5 of a bicycle frame and on which a handlebar stem 7 is clamped. Rotational movement of the steerer tube 3 relative to the head tube 5 is enabled by a threadless headset that is comprised of a lower bearing cup 9, bearing 11, and crown race 13 at the bottom end of the head tube 5 and a bearing cover 14, compression member 16, bearing 18, and bearing cup 20 at the top end of the head tube. An adjusting bolt 21, top cover 23 and preload mechanism 25 hold the steering assembly 1 together on the front fork 2. To the extent described so far, steering assembly 1 is of conventional construction and the components mentioned so far can be of any known design, not only that shown here. For example, other arrangements of the headset assembly are possible, such as with bearings interfacing directly with the head tube, non-overhanging bearing covers, bearing cups where the bearings reside within the head tube, headset assemblies where the compression member is above the top cover, etc.

Figure 2:
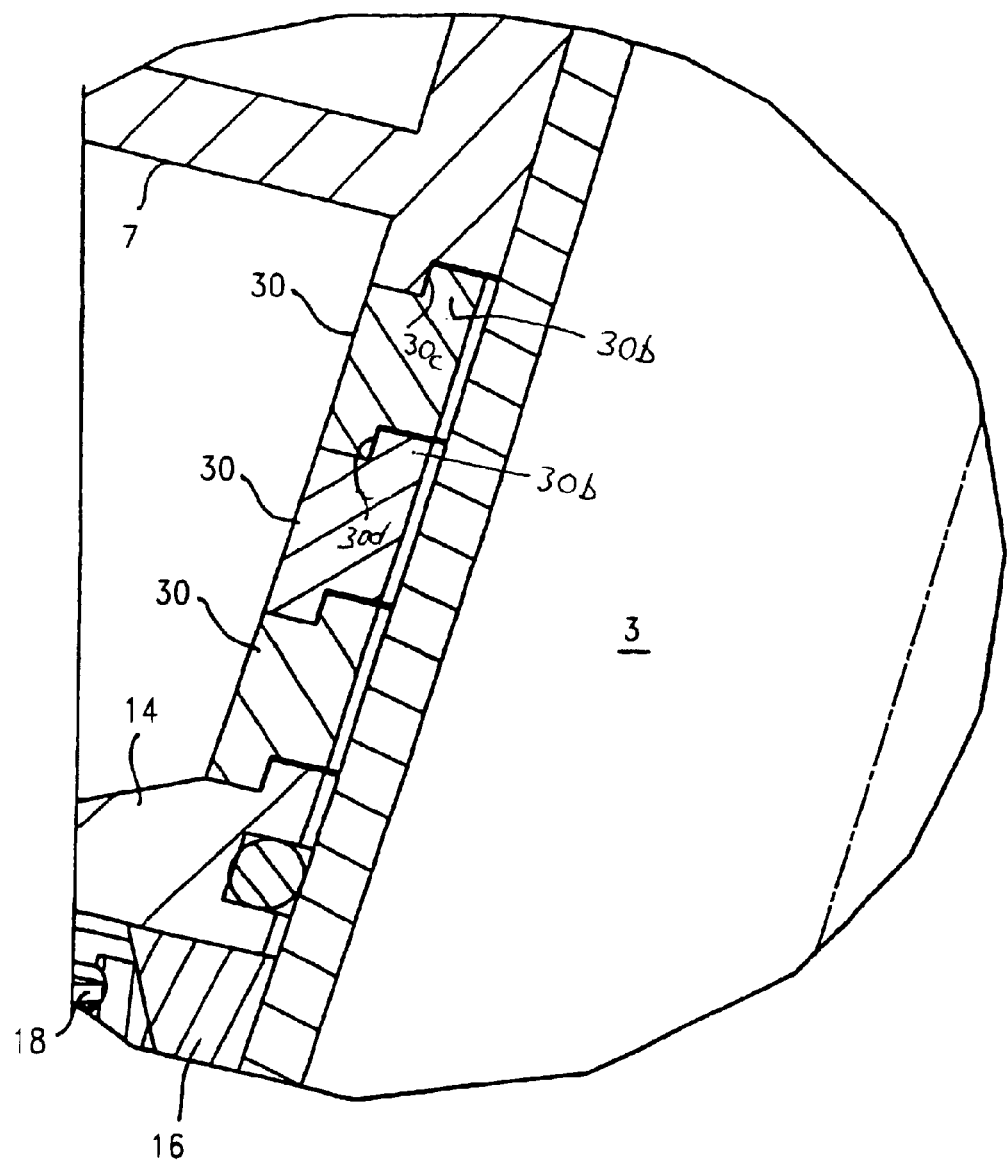
FIG. 2 shows detail "A" of FIG. 1 on an enlarged scale.
Figure 7:
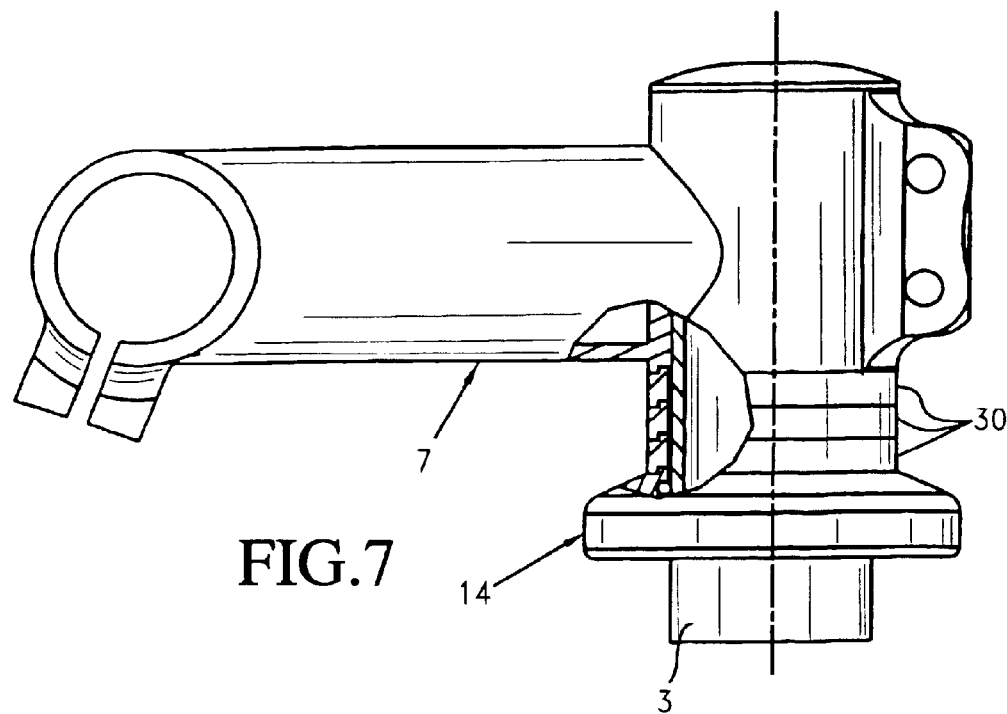
FIGS. 7 & 8 show, respectively, a steering assembly in which the spacer unit is interlockable with the handlebar stem and the headset top cover of the bicycle steering assembly and a steering assembly in which the spacer unit is not interlockable with the handlebar stem and the headset top cover of the bicycle steering assembly.
Figure 8:
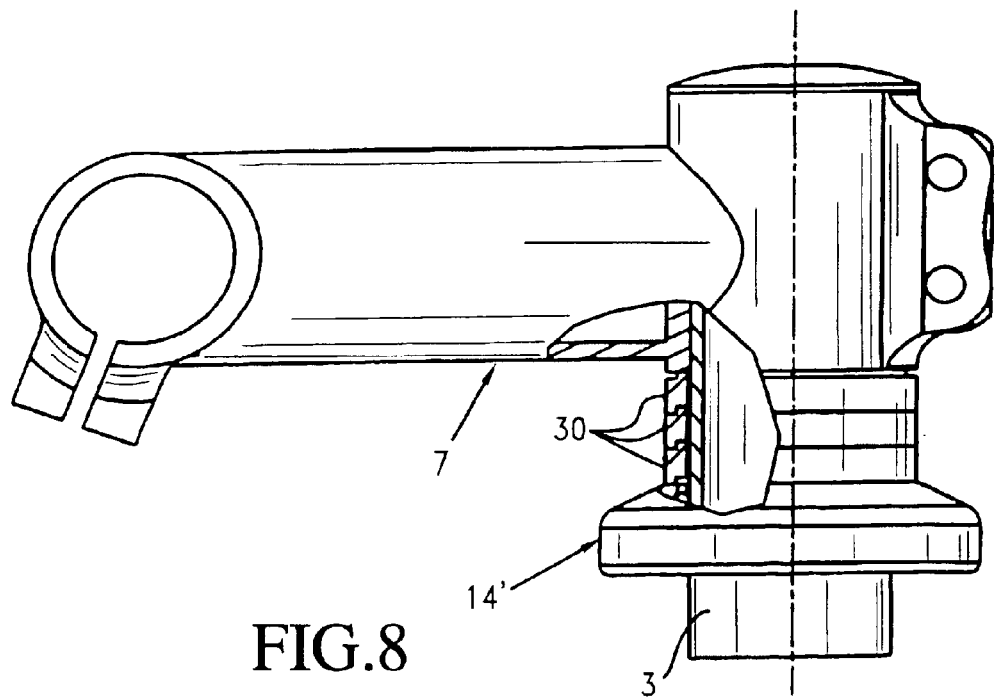

In the illustrated arrangement, a quantity of stem height adjustment spacers, commonly called "headset spacers," are placed above the highest part of the headset assembly and below the handlebar stem. The illustrated spacers 30 exhibit an interlocking feature, such as a counterbore 30a on one face and a complementarily shaped cylindrical protrusion 30b on an opposite face (top face in FIGS. 1 & 3). In this regard, it is noted that the inter-engaging bore and protrusion need not be cylindrical as shown, but can be conical or any other such shape as long as adjacent spacers are able to engage one another so as to prevent radial movement between them once assembled. Furthermore, it is advantageous if the counterbore 30a and protrusion 30b are shaped to enable the protrusion 30b of one spacer 30 to snap lock into the counterbore 30a of another spacer 30 since it enables a set of spacers to more easily be handled, and increase the rigidity of the spacer unit. In FIG. 2, it can be seen how the counterbore 30a and the protrusion 30b present a stepped configuration the radially facing surfaces of which 30c, 30d, respectively, block radial movement. interlocking feature, such as a counterbore 30a on one face (bottom face in FIGS. 1, 2 & 4) and a complementarily shaped cylindrical protrusion 30b on an opposite face (top face in FIGS. 1 & 3). In this regard, it is noted that the inter-engaging bore and protrusion need not be cylindrical as shown, but can be conical or any other such shape as long as adjacent spacers are able to engage one another so as to prevent radial movement between them once assembled. Furthermore, it is advantageous if the counterbore 30a and protrusion 30b are shaped to enable the protrusion 30b of one spacer 30 to snap lock into the counterbore 30a of another spacer 30 since it enables a The preferred embodiment steering assembly 1 shown also provides the highest part of the headset assembly and lower part of the handlebar stem with a similar configuration so that they are able to interlock with the spacers 30 as well. It is preferred for spacers to have opposite mating shapes on both top and bottom to facilitate stacking of multiple spacers; however, as shown in FIG. 9C, a spacer 30' could possess such feature on only one side and function as dedicated top or bottom spacer. This may be most appropriate when interlocking spacers are used with headset assemblies and handlebar stems not possessing complementing interlocking configurations (see, the handlebar stem and bearing cover 14' in FIG. 8), both for aesthetic reasons and to achieve greater surface area for contact.

In the situation that headset spacers are not required, it is still desirable to have interlocking features between the handlebar stem and highest component of the headset assembly. As is apparent from FIGS. 1–5, 7 & 8, the lower face of the handlebar stem 7 being the same as the lower side of the spacers 30, will mate with the upper side of the bearing cover 14, which has the same configuration as the upper side of the spacers 30.

Successive spacers need not be identical in cross sectional shape as it is possible to have shapes that assemble to prevent radial freedom while being of different cross sections. In this regard, FIG. 9E shows spacers 30 of differing heights.

The purpose of the interlocking features is to minimize the tendency for the spacers to move radially under the influence of externally applied loads, e.g., as transferred from the handlebars, thus eliminating a potential source of movement, instability and noise within the steering assembly. By effectively making the stack of spacers 30 an integral structural part of the handlebar stem 7 and the top of headset assembly, e.g., bearing cover 14, these normally radially independent components are linked in a manner adding significant bending stiffness to the steering assembly 1 above the upper bearing 18.

The described preferred embodiment has the highest component of the headset assembly, e.g., the bearing cover 14, provided with an upward projecting protrusion 14a for interfacing with the inside of the counterbore 30a of the adjacent headset spacer 30, though this could be at the outside or the middle. This preferred embodiment also has the lower face of the clamping portion of the handlebar stem 7 provided with a counterbore 7a for interfacing with the projection 30b of the adjacent spacer 30, though this could be at the inside or middle. The spacers may also be used as illustrated in the preferred embodiment or opposite this, so long as each successive part is stacked so as to result in engagement to prevent radial freedom.

Another scenario for preventing noise and reducing, but not eliminating radial movement, is the use of an o-ring or similar resiliently compliant part placed within the radial gap between the steerer and spacer. For example, each spacer could have an o-ring contained within a groove in its inner circumferential surface or at the inner periphery of one of its top and bottom surfaces, in which case the spacers would create an o-ring gland between each pair of adjacent headset spacers when assembled.

As a secondary feature of the interlocking headset spacers 30, it is possible to assemble them in a manner opposite the interlocking direction, foregoing the benefit of interlocking, for the potential to raise the cumulative stack height of the spacers. This enables the use of multiple fixed height spacers in variable arrangements to achieve numerous discrete multiple heights. This can be seen from FIG. 5 where a stack height X results when the spacers are arranged to interlock and a larger stack height Y results when the top and bottom spacers 30 are inverted to prevent inter-engagement. FIG. 6 shows three possible heights A, B, C that are obtainable by fully inter-engaging, partially inter-engaging, and preventing inter-engagement of spacers 30, respectively.

Figure 9A:
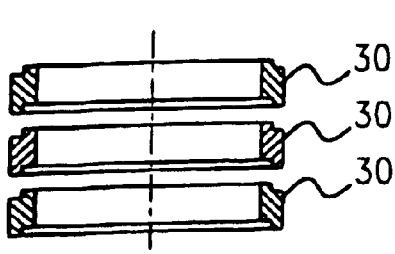
FIGS. 9A–9E show various spacer units in accordance with the invention.
Figure 9B:
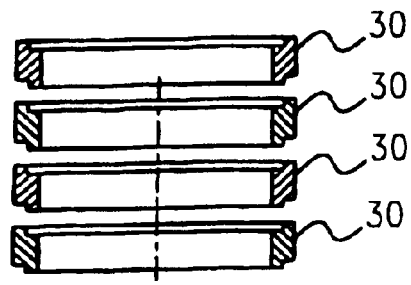
Figure 9C:
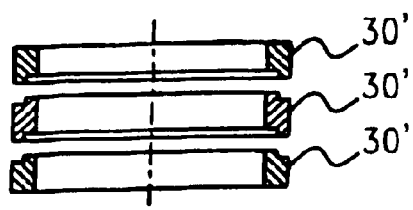
Figure 9D:
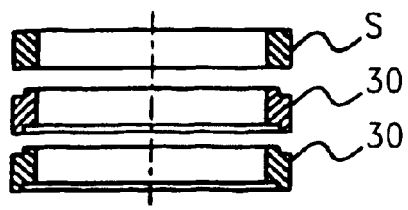
Figure 9E:
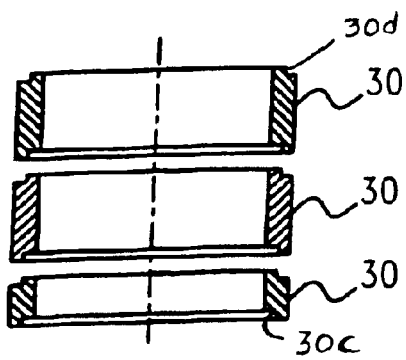
Figure 9F:
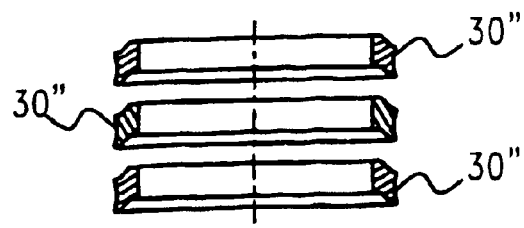

As is apparent from FIGS. 9A–9F, the interlocking spacers may be in the orientation shown for the preferred embodiment (FIG. 9A) or inverted relative thereto and with differing numbers of spacers from the three shown (FIG. 9B). Furthermore, as noted above, dedicated top and bottom spacers 30' may be provided (FIG. 9C) or the conventionally non-interlocking spacers S can be used in combination with the inventive interlocking spacers (FIG. 9D). As also noted above, the spacers 30 need not be all of the same height (FIG. 9E). Still further, any shapes that will interlock can be used, FIG. 9F showing one alternative spacer 30" and others are described below.

Figure 11:
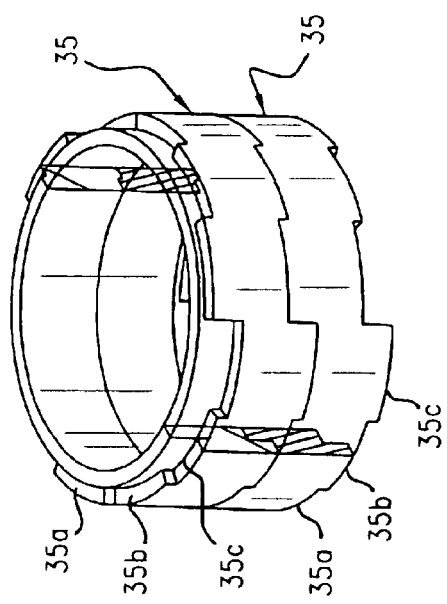
FIG. 11 is a perspective view of the FIG. 10 embodiment in an interlocked condition.
Figure 10:
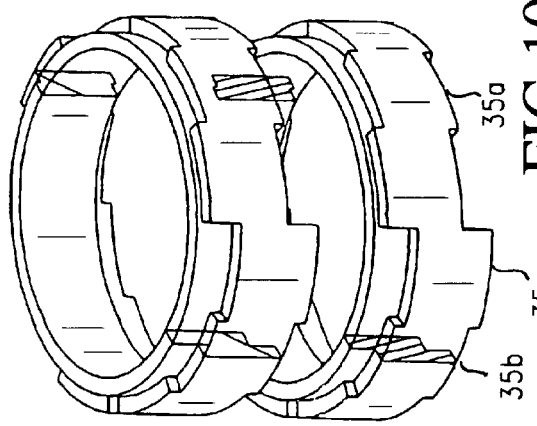
FIG. 10 is an exploded perspective view of another embodiment of a spacer unit in accordance with the present invention.
Figure 12:
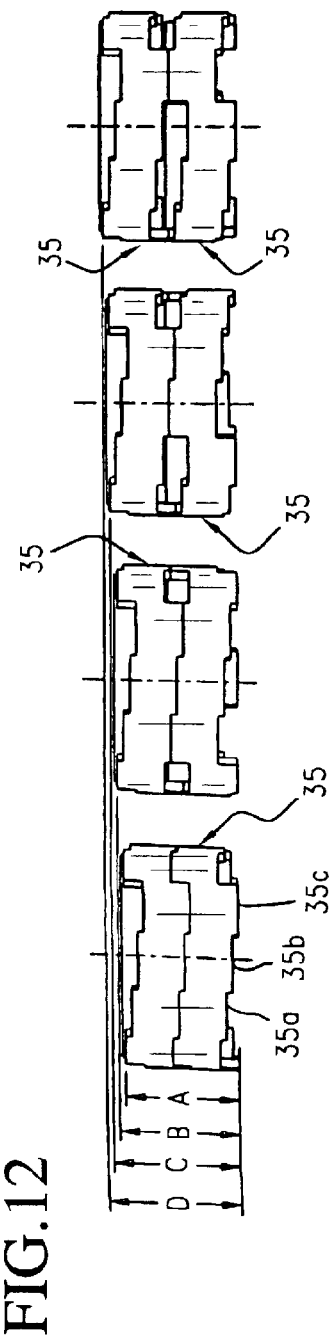
FIG. 12 shows the various stack heights obtainable by varying the relative rotational position of the spacers of the FIG. 10 spacer unit.

The spacers may also be constructed such that they exhibit a feature that prevents relative rotational type motion relative to the steerer axis. This could be accomplished by another interlocking type feature on top and/or bottom of the spacers (i.e., teeth) or a "friction" surface, such as a texture, coating, o-ring, or the like. In FIGS. 10–12, spacers 35 are shown in which a "staircase" configuration of steps 35a–35c that increase in height in a circumferential direction is provided. As can be seen from FIG. 12, by change the relative rotational position of the spacers 35, four different stack heights A, B, C, & D are obtainable. It is also noted that by making the steps small and greater in number, and by providing the steps with ratchet-like sloped surfaces, the spacers can serve the added function of providing a preload adjustment mechanism. That is, after the stem 7 is tightened on the steerer tube 3, one of the spacers 35 could be rotated so as to increase the stack height, and thus, the bearing preload. In such a case, the outer periphery of the spacers 35 would be provided with a slot or notch or nut-shape which would enable it to be engaged by a wrench or other tool for purposes of rotating it.

Figure 13:
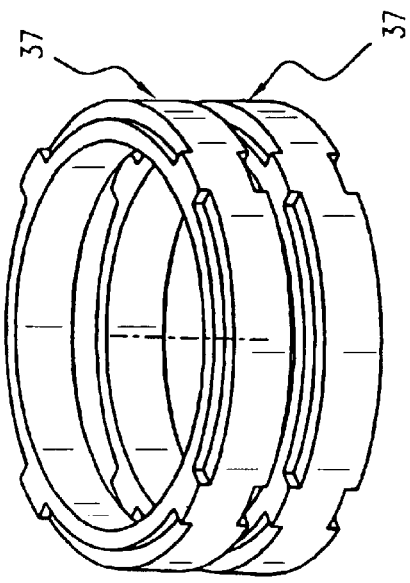
FIG. 13 is an exploded view of a spacer unit configured to precluded relative rotation between spacers.

FIG. 13 shows a simpler form of relative rotation preventing spacer 37. In this case, the spacers 37 are provided with a step and notch configuration which will prevent relative rotation between adjoining spacers, but otherwise functions in the same manner as the spacers 30.

As will be apparent to those skilled in the art, the present invention is susceptible of numerous variations and modifications, and as such should not be viewed as limited to only those features and embodiments shown. Accordingly, the invention is intended to encompass the full scope of the appended claims.

What is claimed is:

1. Steering assembly comprising a headset, a handlebar stem and a headset spacer unit, wherein said headset spacer unit comprises a plurality of annular spacers, each of the spacers having a configuration at top and bottom sides thereof which is shaped to enable a bottom side of each of the plurality of spacer to make an interlocking engagement with a top side of another of said plurality of annular spacers in a manner preventing relative radial movement therebetween, said configuration comprising a stepped configuration with radially facing surfaces that physically block said radial movement; wherein a highest component of the headset and a bottom surface of said handle bar stem have a complementary configuration for engaging with the configuration of a respective side of the spacers; and wherein the stepped configuration at top and bottom sides of the spacers is formed by a counterbore on one of said sides and & protrusion on the other of said sides.

2. Steering assembly according to claim 1, wherein said protrusion and counterbore are shaped to produce a snap lock engagement of a protrusion of one spacer in a counterbore of another spacer.

3. Steering assembly according to claim 1, wherein said spacers comprise spacers of different heights.

4. Steering assembly according to claim 1, further comprising a dedicated end spacer having said configuration at only one side thereof.

* * * * *